Figure 1:
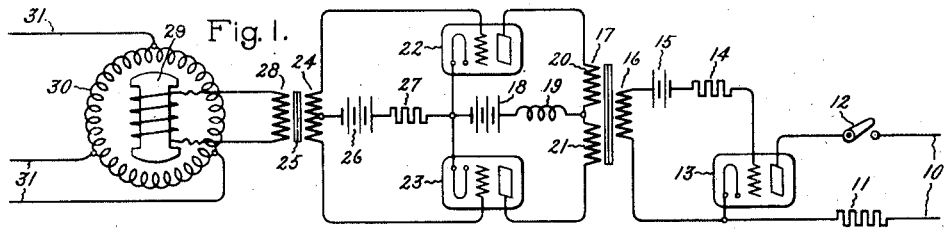

May 11, 1937.　　　B. D. BEDFORD　　　2,080,250
ELECTRIC VALVE CIRCUIT
Filed Sept. 29, 1930　　　2 Sheets-Sheet 1

Inventor:
Burnice D. Bedford,
by Charles W. Mullar
His Attorney.

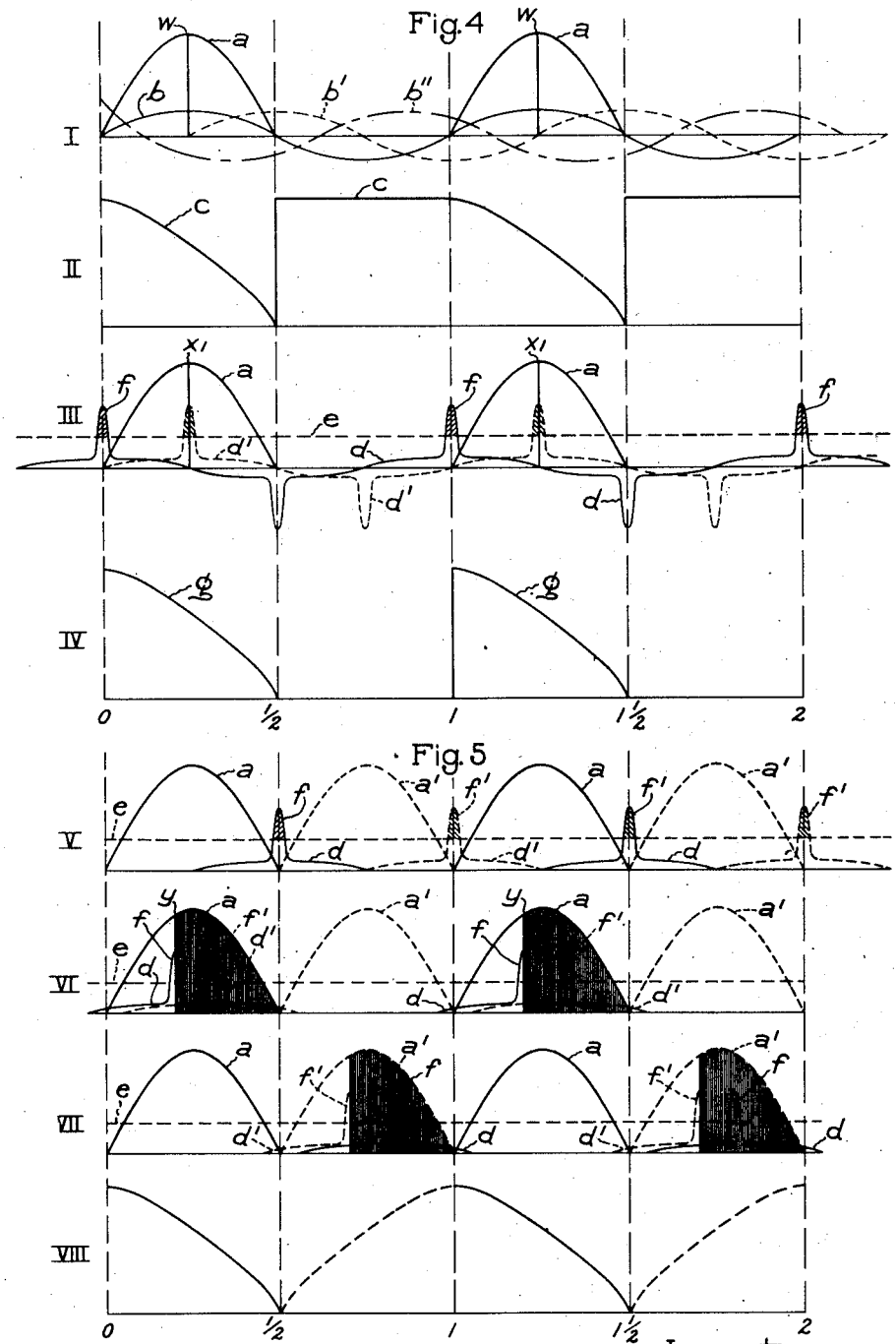

Patented May 11, 1937

2,080,250

UNITED STATES PATENT OFFICE 2,080,250

ELECTRIC VALVE CIRCUIT

Burnice D. Bedford, Schenectady, N. Y., assignor to General Electric Company, a corporation of New York Application September 29, 1930, Serial No. 485,335

17 Claims. (Cl. 175—363)

My invention relates to electric circuits and more particularly to electric circuits including an electric valve of the vapor discharge type provided with an anode, a cathode and a control grid and to improved apparatus for supplying excitation to the control grid of the electric valve.

Heretofore, various circuits have been devised utilizing vapor electric discharge valves for controlling, regulating or converting electrical energy. In securing the desired control, regulation or conversion, it has been customary to provide an alternating potential having a sine wave form for the control grid and to secure the desired control or regulation by varying the magnitude of the grid potential or by shifting its phase with respect to the corresponding anode potential, or by a combination of both of these methods. It has been found, however, that the use of a sine wave of grid potential imposes certain limitations upon the associated apparatus. For example, in the case of a controlled rectifier, the average output of the rectifier may be controlled from maximum to minimum by a shift in phase of the grid potential of 180°, but for the next succeeding phase shift of 180° the output of the rectifier remains constant at its maximum value.

It is an object of my invention to provide an improved electric valve circuit which will overcome the above-noted disadvantages, which will be simple and reliable in operation, and which will afford a maximum flexibility of control.

It is a further object of my invention to provide an electric circuit including an electric valve in which the exciting potential for the control grid shall be a periodic potential of a peaked wave form.

It is a further object of my invention to improve the operating characteristics of certain electric circuits including electric valves by providing an alternating potential of peaked wave form for the grid excitation of the valve.

In accordance with my invention, I provide an electric valve with a grid circuit including a source of negative bias potential and a source of alternating potential having a peaked wave form, the maximum value of the peaked wave being substantially greater than the negative bias. The alternating potential of peaked wave form may be derived from any of the several types of apparatus known in the art for developing such a wave form, such for example, as a saturating transformer, but preferably I supply this alternating peaked potential from an improved apparatus which constitutes one feature of my invention. This improved apparatus includes a pair of inductive windings energized from a source of direct current through a large reactor and a pair of electric valves. Means are provided for alternately rendering these valves conducting with the result that the exciting current of the inductive windings is rapidly transferred from one to the other. A very steep wave of alternating potential is generated in a secondary winding inductively associated with the inductive winding. In accordance with one modification of my invention, I make use of this improved excitation for electric valves for positively determining the point in the cycle of an alternating wave at which current is supplied from a source of energy to a load circuit, irrespective of the time of closing the switch connecting the load to the source.

According to another modification of my invention, I apply my improved excitation circuit to the electric valves of a power converting apparatus for transmitting power from a direct current circuit to an alternating current circuit of the type known in the art as a series inverter. When a sine wave of potential is applied to the grids of the valves of such an apparatus, it sometimes happens that the grid circuit is completed near the end of a positive half cycle of grid potential. When this occurs, the valve current is near its maximum instantaneous value when the grid potential reverses polarity and the other valve becomes conducting, with the result that the current in the first valve is not interrupted and the direct current source is short circuited through the two electric valves. However, by the use of my improved excitation circuit, neither valve can be made conducting within less than a complete half cycle after the preceding valve, so that this possibility of a short circuit is eliminated.

In accordance with a still further modification of my invention, I provide a pair of controlled rectifiers connected in opposition to a common direct current load circuit. With my improved excitation circuit applied to the electric valves of these rectifiers, it has been found that the rectifiers are alternately inoperative during successive half cycles of phase shift of the grid potentials, with the result that the current to the load circuit may be varied from zero to maximum in either direction without the possibility of a short circuit which would otherwise occur between the two rectifiers connected in opposition.

Figure 2:
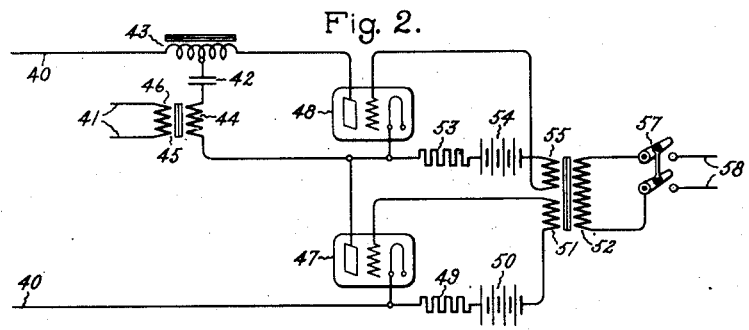
Figure 3:
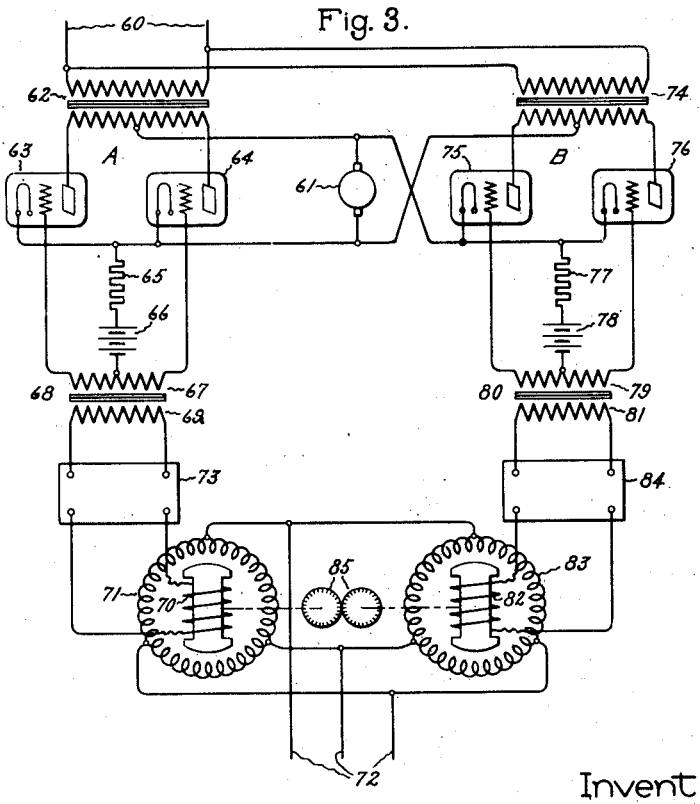

For a better understanding of my invention together with other and further objects thereof, reference is had to the accompanying drawings and its scope will be pointed out in the appended claims. Fig. 1 of the drawings illustrates an embodiment of my invention as applied to a circuit for connecting a load to a source of electric energy at a predetermined point in the cycle of an alternating electric wave; Fig. 2 illustrates an embodiment of my invention as applied to electric power converting apparatus for transmitting current from a direct current circuit to an alternating current circuit; Fig. 3 illustrates an embodiment of my invention as applied to a pair of controlled rectifiers oppositely connected for supplying energy to a common load circuit, and Figs. 4 and 5 show certain wave forms and operating characteristics of the apparatus illustrated in Fig. 3.

In Fig. 1, I have illustrated a circuit by means of which a load device may be connected to a source of current only at a predetermined point in the cycle of an alternating potential. This circuit comprises a source of current 10, either alternating or direct, connected to the load device 11 through a connecting switch 12 and an electric valve 13. The electric valve 13 is provided with an anode, a cathode and a control grid, and may be of any of the several types well known in the art, but I prefer to use a vapor electric discharge valve or some form of a discontinuous control electric valve. By the term "discontinuous control electric valve" I mean that type of electric valve in which the starting of current through the valve is determined by the excitation of a control electrode, but in which the current through the valve may be interrupted only by reducing the anode potential below its critical value. This type of valve is to be distinguished from the continuous control electric valve of which the high vacuum tube is a typical example in which the instantaneous current through the valve is continuously determined by the excitation of a control electrode. The valve 13 is provided with a grid circuit including a current limiting resistor 14, a source of negative bias potential shown as a battery 15, and a source of alternating potential of a peaked wave form shown as the secondary winding 16 of a transformer 17. While I may derive the alternating potential of peaked wave form from any of several types of apparatus well known in the art, such as a saturating transformer, I prefer to supply this alternating potential from an improved apparatus which constitutes another feature of my invention.

My improved apparatus for generating an alternating potential of peaked wave form comprises a source of direct current shown as a battery 18 connected through a large reactor 19 to energize inductive windings 20 and 21 through electric valves 22 and 23 respectively. While I have shown the inductive windings 20 and 21 as constituting two primary windings of a transformer, it will be obvious to those skilled in the art that these inductive windings may take the form of two separate transformers or of a single inductive winding provided with a mid-tap and a secondary winding 16 inductively associated therewith. The electric valves 22 and 23 are preferably of the continuous control type, such as high vacuum tubes, each provided with an anode, a cathode and a control grid. The grid circuits of the valves 22 and 23 include a negative bias battery 26, a current limiting resistor 27, and opposite halves of the secondary winding 24 of a transformer 25. The primary winding 28 of the transformer 25 may be energized from the secondary winding 29 of a rotary phase shifting transformer 30, connected to a three phase alternating current circuit 31, or by any other suitable phase shifting arrangement.

In explaining the operation of the above described arrangement, it will be assumed that the alternating current circuit 31 is energized and that it is desired that current should be supplied from the source 10 to the load device 11 only at a predetermined point in the cycle of the alternating potential of the circuit 31, irrespective of the time at which the connecting switch 12 is closed. With an alternating potential of the wave form supplied by the secondary winding 16, the grid of the electric valve 13 will be positive only for the short interval when the positive peaked wave overcomes the negative bias of the battery 15 which may be only a few electrical degrees, so that irrespective of when the connecting switch 12 is closed, the electric valve 13 will not become conducting until the next positive peak of alternating potential occurs. The position in the cycle of alternating potential of the circuit 31 at which this positive peak occurs depends upon the position of the secondary member 29, which may be adjusted as desired.

The above described generating circuit operates to supply a source of alternating potential of peaked wave form as follows: Assume that the electric valve 22 is first made conducting by a positive potential impressed upon its grid. Current will flow from the battery 18 through the reactor 19, the secondary winding 20 of the transformer 17 and the electric valve 22. At the beginning of the next half cycle of grid potential, the electric valve 23 is made conducting by a positive potential upon its grid and at the same instant the grid of the electric valve 22 is made negative. The amplitude of the grid potential supplied by the transformer 25 is preferably sufficient to considerably over-excite the valves 22 and 23, that is, the valves 22 and 23 operate beyond their saturation point, so that the change from maximum to minimum impedance is effected within a few electrical degrees. The result is that the current is instantly interrupted in the electric valve 22. The inductance of the reactor 19 is made very large as compared with that of the transformer windings 20 and 21 so that the flow of current from the battery 18 is maintained substantially constant. Inasmuch as the electric valve 22 now offers practically an infinite impedance to the flow of current, the current from the source 18 is transferred almost instantly from the inductive winding 20 to the inductive winding 21 and there results a very rapid reversal of flux in the core of the transformer 17. This rapid reversal of flux effects a very high peaked potential wave in the secondary winding 16. By the use of this arrangement it is only necessary to furnish from the source 18 the magnetizing current of the transformer 17, while in the case of a saturating transformer large energy losses are consumed in the saturating winding. It is obvious that the phase of the potential applied to the grids of the electric valves 22 and 23 may be shifted by adjusting the position of the secondary member 29 of the transformer 30 and that this shift in phase of the grid potential effects a corresponding shift in phase of the potentials supplied by the secondary winding 16 of the transformer 17.

In Fig. 2 I have illustrated my invention as applied to electric power converting apparatus for transmitting current from a direct current circuit 40 to an alternating current circuit 41. This apparatus includes a capacitor 42 adapted to be charged from the direct current circuit 40 through a circuit consisting of the left hand portion of a reactor 43, the primary winding 44 of a transformer 45, the secondary winding 46 of which is connected to the alternating current circuit 41, and an electric valve 47. A discharge circuit for this capacitor 42 consists of the right hand portion of the reactor 43, an electric valve 48, and the primary winding 44. The electric valves 47 and 48 are each provided with an anode, a cathode and a control grid, and are preferably of the discontinuous control type. The grid circuits of the electric valves 47 and 48 comprise respectively the current limiting resistor 49, negative bias battery 50, a secondary winding 51 of a grid transformer 52, and a current limiting resistor 53, a negative bias battery 54, and a secondary winding 55 of the transformer 52. The primary winding of the transformer 52 is energized from a circuit 56 through the switch 57. The circuit 58 is energized from a source of alternating potential of peaked wave form, such as an apparatus similar to that described in Fig. 1.

In order to understand the operation of my invention more fully, it will first be assumed that a source of sine wave potential is connected to the circuit 58, and that the switch 57 is closed during the latter portion of a half cycle which places a positive potential upon the grid of the electric valve 47. Charging current for the capacitor 42 will now flow from the direct current circuit 40 through the reactor 43 and will build up rapidly following approximately a sine wave. However, under the assumed condition, the grid potential will reverse polarity in a small fraction of a cycle and will impose a positive potential upon the grid of the valve 48, thereby rendering it conducting. Since a large current is still flowing in the valve 47, both valves are conducting and the direct current circuit is short circuited through the reactor 43 and the valves 47 and 48.

Assume now that a source of alternating potential of peaked wave form is connected to the circuit 58. With this connection, the valves 47 and 48 are rendered conducting only when a peaked wave of a potential positive with respect to the corresponding anode potential overcomes the negative bias of the batteries 50 or 54 so that each valve 47 and 48 is rendered conducting for a very short interval only once during each cycle and the times at which these valves are rendered conducting are a complete half cycle apart, so that the switch 57 may be closed at any time. As before assume that the first peaked wave is positive with respect to the anode potential of the valve 47 so that it becomes conducting. The current will flow from the direct current 40 to charge the capacitors 42 as before, and will build up to its maximum value and then again decrease as the capacitor 42 becomes completely charged, the charging current following a sine wave form. The capacitor 42 and the reactor 43 are so proportioned that the natural period of this oscillatory current is approximately the same as that of the alternating potential of the circuit 58. When the grid potential reverses polarity the valve 48 becomes conducting and the capacitor 42 immediately begins to discharge through the right hand portion of the reactor 43, the valve 48, and the primary winding 44. This flow of current through the right hand portion of the reactor 43 induces a large potential in the left hand portion which is opposite to that tending to charge the capacitor 42 from the source 40. Since the capacitor 42 is nearly completely charged so that the difference between its potential and that of the source 40 is small, the potential induced in the left hand portion of the reactor 43 is much larger than that tending to send a current through the device 47 and is in an opposite direction, with the result that the small current now flowing through the valve 47 is instantly interrupted. It will thus be seen that it becomes impossible to short circuit the direct current source 40 through the electric valves 47 and 48.

In Figure 3 I have illustrated my invention as applied to electric power converting apparatus, comprising two rectifiers A and B connected to transmit energy from an alternating current circuit 60 to a common direct current load shown as a direct current motor 61. The rectifier A comprises a transformer 62, the primary winding of which is connected to the alternating current circuit 60, and electric valves 63 and 64, preferably of the discontinuous control type, connected between opposite terminals of the secondary winding and the negative direct current line. The other direct current line is connected to the electrical midpoint of this secondary winding. A grid circuit is provided for each of the electric valves 63 and 64 including a current limiting resistor 65, a negative bias battery 66, and opposite halves of the secondary winding 67 of a grid transformer 68. The primary winding 69 of this grid transformer is energized from the secondary winding 70 of rotary phase shifting transformer 71, energized from a three phase alternating current circuit 72. Between the windings 69 and 70 is interposed an apparatus 73 for converting a sine wave of alternating potential into one of peaked wave form, such for example as that described in connection with Figure 1. Similarly, the rectifier B comprises a transformer 74, the electric valves 75 and 76 provided with grid circuits including a current limiting resistor 77, a negative bias battery 78, and opposite halves of the secondary winding 79 of a grid transformer 80. The connections of rectifiers A and B are the same, but the direct current circuit of the rectifier B is reversed with respect to that of rectifier A, so that rectifier B tends to furnish current to the direct current motor 61 in a direction opposite to that furnished by rectifier A. Similarly the primary winding 81 of the grid transformer 80 is energized from the secondary member 82 of a rotary phase shifting transformer 83, energized from the alternating current circuit 72. An apparatus 84 similar to the apparatus 73, is interposed between the windings 82 and 81 to convert the sine wave alternating potential into one of peaked wave form. The secondary windings 70 and 82 are mechanically interlocked through the gearing 85 to simultaneously rotate in opposite directions.

In general, the operation of controlled rectifiers such as A and B is well understood by those skilled in the art. When the alternating potential applied to the grids of electric valves 63 and 64 is in phase with the anode potentials of these devices, successive half waves of alternating current alternately flow in the electric valves 63 and 64, for example, and the rectifier will deliver its maximum direct current output. If now the alternating potential applied to the grid circuits is shifted so as to lag the anode potential, the electric valves are not rendered conducting until some later time in the half cycle of positive anode potential, with the result that current flows through each of the electric valves for only a portion of the cycle, and the rectifier output is decreased. Its output decreases with increase of the phase shift until the grid potential is directly opposite in phase to the anode potential, at which point the output of the rectifier is zero. With an increase of the phase shift above 180°, however, it will be noted that the half wave of grid potential slightly overlaps the next succeeding half wave of anode potential, so that during the next 180° of phase shift, the electric valves are fully conducting during their complete half cycles, and the rectifier output is a maximum. This will be clearly understood by referring to diagrams I and II of Fig. 4. In diagram I, the curves $a$ represent the positive half waves of anode potential of one of the electric valves. The curve $b$ represents the corresponding curve of grid potential when in phase with the anode potential. In this condition, both the grid and the anode are made positive at the same instant, and the electric valve will conduct during its respective half cycle. Curve $b'$ represents a grid potential which has been shifted to lag approximately 90° behind the anode potential. In this condition the electric valves are not rendered conducting until 90° after their anode becomes positive and only a half of the corresponding half waves of alternating current are rectified by these valves. Curve $b''$ represents the grid potential with a phase shift of substantially more than 180°. With such a phase shift, it will be noted that the grid of the electric valve is positive at the beginning of each half wave of positive anode potential, so that the valve will conduct during its complete half cycle. Curve $c$ in diagram II represents the variation in average output of a rectifier with an increasing lagging angle of phase shift between the grid and anode potentials. It is seen that for alternate half cycles, the rectifier is delivering its maximum output and is not under the control of the grid. It would not, of course, be possible to supply such excitation to the oppositely connected rectifiers A and B, for both would be delivering at least a portion of their output at the same time, and, since they are oppositely connected, this would constitute a virtual short circuit.

In diagram III of Fig. 4, is illustrated a characteristic curve of grid potential as obtained from apparatus connected in accordance with my invention. In this diagram the curve $a$ represents the positive half wave of anode potential as in diagram I. The curve $d$ represents an alternating potential of peaked wave form, while the straight line $e$ represents the negative bias included in the grid circuit. The shaded portions $f$ represent the periodic positive impulses of grid potential. Curve $d$ represents the condition in which these positive impulses are in phase with the anode potential, that is when they occur at the beginning of each half cycle of positive anode potential. With these two potentials in phase, each rectifier valve conducts during its corresponding half cycle, and the rectifier will deliver its maximum output. The curve $d'$ represents the alternating wave of grid potential when it has been shifted to lag the anode potential by approximately 90°. Under this condition, each electric valve will be rendered conducting approximately 90° after its anode potential becomes positive, and each rectifier valve will deliver only one-half of its respective half wave of alternating current. Thus it is seen that for a shift in phase between the grid and anode potentials of 180° or less, the characteristics of the rectifier are the same no matter which type of excitation is used. However, if this peaked wave of grid potentials is shifted to lag more than 180° behind the anode potential, it will be seen that these positive impulses occur during the half cycles of negative anode potential, and the electric valves will deliver no current. Hence, with a shift in phase between 180 and 360 degrees lagging between the grid and anode potentials, the electric valves are at all times non-conducting and the rectifier will deliver no current. The average output characteristic of the rectifier with this type of excitation is shown by the curve $g$ in diagram IV.

The above described characteristic has been utilized in the arrangement shown in Fig. 3, the grid and anode potentials of the two rectifiers A and B having opposite phase relations, so that one rectifier is conducting only during the first 180° of grid phase shift, while the second rectifier is conducting only during the second 180° of phase shift. I have also arranged the grid potentials to be simultaneously shifted in phase in opposite directions in order to secure a smooth variation of rectifier output from zero to maximum in either direction rather than a decrease from maximum to minimum in one direction followed by a sudden increase to maximum in the other direction as would occur if the grid potentials were shifted in phase in the same direction. In diagram V of Fig. 5, the curves $a$ represent the positive half waves of anode potential applied to one valve of one of the rectifiers, while the curve $a'$ represents the positive half wave of anode potential applied to a corresponding valve of the other rectifier. The shaded portions $f$ and $f'$ represent the positive impulses of grid potential of the two rectifiers respectively. As shown in this diagram, the grid potentials are completely out of phase with the anode potentials, so that neither rectifier is delivering power. Since the phases of the grid potentials of the two rectifiers are being shifted in opposite directions, the abcissae of the diagrams of Fig. 5 are in terms of cycles of grid phase shift of one of the rectifiers, for example rectifier A. Since the grid potentials are being shifted in phase in opposite directions, in the curves of diagram VI the wave of grid potential $d$ has been advanced slightly more than 90° and the grid potential of the other rectifier represented by the curve $d'$ has been retarded by a corresponding angle, as shown. With this phase shift, rectifier A will become conducting at the point $y$, while rectifier B will not conduct at all since the positive impulses of grid potential of this rectifier occur only when the anode potential is negative. The curves of diagram VII represent the opposite condition, that is, with the grid potential $d'$ of the rectifier B advanced through somewhat more than 90°, and the grid potential of rectifier A retarded through a corresponding angle. The average output characteristic of the rectifier aggregate is shown in diagram VIII, from which it is seen that during one complete cycle of grid phase shift, that is through 360°, the average output of the rectifier is decreased a maximum in one direction to zero, and then increased to the maximum output in the opposite direction. It will be understood, of course, that in the above described diagram the output of only a single tube of each rectifier has been illustrated, but since the average output of each valve for a given angle of grid phase shift is the same, the above diagram will correctly indicate the characteristics of the apparatus.

While I have shown and described what I at present consider preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. Apparatus for generating a periodic potential having a peaked wave form comprising a circuit including a source of direct current, a pair of inductive windings, means for maintaining the current delivered by said source substantially constant, means for periodically effecting a sudden transfer of current from said source between said inductive windings comprising an electric valve associated with each of said inductive windings and means for overexciting said valves with alternating potentials of opposite polarities, and a load circuit associated with said inductive windings.

2. Apparatus for generating a periodic potential having a peaked wave form comprising a source of direct current and a reactor connected in series with two parallel circuits each comprising an inductive winding and an electric valve provided with a control grid, said reactor serving to maintain the current delivered by said source substantially constant, means for impressing upon the control grids of said valves alternating potentials of opposite polarity and of amplitudes sufficient to overexcite said valves substantially and a load circuit associated with said inductive winding.

3. Apparatus for generating a periodic potential having a peaked wave form comprising a source of direct current and a reactor connected in series with two parallel circuits comprising opposite halves of an inductive winding and a pair of electric valves provided with control grids, the reactance of said reactor being substantially greater than that of said inductive winding, grid circuits associated with said valves and including sources of alternating potential opposite in phase and of amplitudes sufficient to overexcite said valves, and a load circuit associated with said inductive windings.

4. In combination, a load circuit, an alternating current circuit, means for supplying said load circuit with direct current variable from zero to a maximum in either direction comprising a pair of rectifying circuits, oppositely connected, each of said rectifying circuits including a discontinuous control electric valve provided with a control grid, means for impressing upon said grids a periodic positive potential of peaked wave form, and means for shifting the phase of said grid potential with respect to the potential of said alternating current circuit.

5. In combination, a load circuit, an alternating current circuit, means for supplying said load circuit with a direct current, variable from zero to a maximum in either direction comprising a pair of rectifying circuits, oppositely connected, each of said rectifying circuits including a discontinuous control electric valve provided with a control grid, a grid circuit for each valve including a source of negative bias potential and a source of alternating potential of peaked wave form and having an amplitude substantially greater than that of the bias potential, and means for shifting the phase of said grid potentials of said rectifier circuits in opposite directions with respect to the potential of said alternating current circuit through substantially 180 degrees.

6. In combination, an alternating current circuit, a pair of rectifying circuits oppositely connected and adapted to deliver current to a common direct current circuit, each of said rectifier circuits including a discontinuous control electric valve provided with a control grid, circuits connecting the grids and cathodes of the several valves, said grid circuits each including a source of negative bias potential and a source of alternating potential of peaked wave form and of an amplitude substantially greater than that of the bias potential, and means for shifting the phase of said grid potentials of said rectifier circuits oppositely through 180 degrees whereby said rectifiers are rendered conducting over opposite grid phase shifts of 180 degrees to deliver power in opposite directions to said direct current circuit.

7. In a system for transmitting energy between direct current and alternating current circuits including a pair of serially connected discontinuous control electric valves, each provided with an anode, a cathode, and a control grid, means for preventing the simultaneous flow of current in both of said valves comprising grid circuits for said valves including sources of periodic potential opposite in phase and of a peaked wave form.

8. The combination of a plurality of discontinuous control electric valves each provided with an anode, a cathode and a control grid, a capacitor, a capacitor charging circuit including one of said valves, a capacitor discharging circuit including another of said valves, an alternating current circuit common to said charging and discharging circuits, means for successively rendering said valves conducting at intervals of substantially one half cycle comprising grid circuits for said valves including sources of periodic potential opposite in phase and of a peaked wave form.

9. The combination of a plurality of discontinuous control electric valves, each provided with an anode, a cathode, and a control grid, a capacitor, a capacitor charging circuit including one of said valves, a capacitor discharging circuit including another of said valves, an alternating current circuit common to said charging and discharging circuits, means for successively rendering said valves conducting comprising grid circuits for said valves including sources of alternating potential opposite in phase, and means for initiating operation of said apparatus, said sources of potential having a peaked wave form whereby current will flow through the valve first made conducting for substantially a half cycle before the second valve is made conducting, irrespective of the time of operation of said initiating means.

10. In combination, an alternating current supply circuit, a translation circuit including two pairs of oppositely connected electric valves, and means for maintaining either pair of said valves non-conductive and simultaneously varying the conductivity of the other pair of valves.

11. In combination, an alternating current supply circuit, a load circuit, and means for supplying said load circuit with direct current variable from zero to maximum in either direction comprising a pair of rectifying circuits, oppositely connected, each of said rectifying circuits including an electric valve, and means for maintaining the valve of either of said rectifying circuits non-conductive and simultaneously varying the conductivity of the valve of the other rectifying circuit.

12. In combination, an electric translation circuit including an alternating current circuit and a discontinuous control electric valve provided with an anode, a cathode, and a grid for controlling the current through said valve, a source of periodic potential for exciting said grid, static means interposed between said source and said grid for converting said periodic potential to one of peaked wave form and means interposed between said source and said static means for determining at any point in the cycle of alternating current the instant at which said valve will be rendered conductive.

13. In combination, an electric translation circuit including an alternating current circuit and a discontinuous control electric valve provided with an anode, a cathode, and a grid for controlling the current through said valve, a source of periodic potential for exciting said control grid, and inductive means interposed between said source said grid for converting said periodic potential to one of peaked wave form and adjustable means interposed between said source and said inductive means for determining the point in the cycle of alternating current at which said valve will be rendered conductive.

14. In combination, an electric translation circuit including an alternating current circuit and a discontinuous control electric valve provided with an anode, a cathode and a grid for controlling the current through said valve, a source of periodic potential for exciting said control grid, inductive means interposed between said source and said grid for converting said periodic potential to one having a substantially perpendicular wave front and adjustable means interposed between said source and said inductive means for controlling the point in the cycle of alternating current at which said valve will be rendered conductive.

15. In combination, an electric translation circuit including an alternating current circuit and a discontinuous control electric valve provided with an anode, a cathode, and a grid for controlling the current through said valve, a source of periodic potential for exciting said grid, static means interposed between said source and said grid for converting said periodic potential to one of peaked wave form, and adjustable phase shifting means to render said valve conductive at any predetermined point in the cycle of alternating current.

16. In combination, an electric translation circuit including an alternating current circuit and a discontinuous control electric valve provided with an anode, a cathode, and a grid for controlling the current through said valve, a source of periodic potential for exciting said control grid, inductive means interposed between said source and said grid for converting said periodic potential to one of peaked wave form, and phase shifting means interposed between said source and said inductive means for rendering said valve conductive at any predetermined point in the cycle of alternating current.

17. In combination, an electric translation circuit including an alternating current circuit and a discontinuous control electric valve provided with an anode, a cathode and a grid for controlling the current through said valve, a source of periodic potential for exciting said control grid, inductive means interposed between said source and said grid for converting said periodic potential to one having a substantially perpendicular wave front, and phase shifting means interposed between said source and said inductive means for rendering said valve conductive at any predetermined point in the cycle of alternating current.

BURNICE D. BEDFORD.

CERTIFICATE OF CORRECTION.

Patent No. 2,080,250.  May 11, 1937.

BURNICE D. BEDFORD.

It is hereby certified that error appears in the printed specification of the above numbered patent requiring correction as follows: Page 5, second column, line 32, claim 7, for the syllable "de-" read pe-; and page 6, first column, line 27, claim 13, strike out the word "and" and insert the same after "source" in line 28, same claim; and that the said Letters Patent should be read with these corrections therein that the same may conform to the record of the case in the Patent Office.

Signed and sealed this 6th day of July, A. D. 1937.

Henry Van Arsdale (Seal)  Acting Commissioner of Patents.